United States Patent
Ota (10) Patent No.: US 7,110,219 B2
(45) Date of Patent: Sep. 19, 2006

(54) FLYING TYPE THIN-FILM MAGNETIC HEAD

(75) Inventor: Norikazu Ota, Tokyo (JP)

(73) Assignee: TDK Corporation, Tokyo (JP)

( * ) Notice: Subject to any disclaimer, the term of this patent is extended or adjusted under 35 U.S.C. 154(b) by 217 days.

(21) Appl. No.: 10/735,626

(22) Filed: Dec. 16, 2003

(65) Prior Publication Data

US 2004/0130820 A1    Jul. 8, 2004

(30) Foreign Application Priority Data

Dec. 19, 2002    (JP)    ............... 2002/367746

(51) Int. Cl.
*G11B 5/127*    (2006.01)
(52) U.S. Cl. .................................... 360/128
(58) Field of Classification Search ............. 360/128
See application file for complete search history.

(56) References Cited

U.S. PATENT DOCUMENTS

| | | | |
|---|---|---|---|
| 6,282,061 B1 | 8/2001 | Kanda et al. | |
| 6,455,174 B1* | 9/2002 | Takao et al. | 428/632 |
| 6,859,343 B1* | 2/2005 | Alfoqaha et al. | 360/126 |
| 6,963,464 B1* | 11/2005 | Xu et al. | 360/75 |
| 2002/0191326 A1* | 12/2002 | Xu et al. | 360/75 |
| 2003/0099054 A1* | 5/2003 | Kamijima et al. | 360/59 |
| 2004/0027709 A1* | 2/2004 | Hamaguchi et al. | 360/59 |
| 2004/0165305 A1* | 8/2004 | Nishiyama | 360/75 |
| 2005/0270694 A1* | 12/2005 | Umehara et al. | 360/126 |
| 2006/0007594 A1* | 1/2006 | Umehara et al. | 360/126 |

FOREIGN PATENT DOCUMENTS

| | | |
|---|---|---|
| JP | 4-366408 | 12/1992 |
| JP | 5-266428 | 10/1993 |
| JP | 7-307070 | 11/1995 |

* cited by examiner

*Primary Examiner*—Allen Cao
(74) *Attorney, Agent, or Firm*—Buchanan Ingersoll & Rooney, PC (57) ABSTRACT

A flying type thin-film magnetic head includes a write head element with a coil conductor and a yoke, a write current flowing through the coil conductor, an overcoat layer laminated on the write head element, and a heat-block layer formed in the overcoat layer and made of a material with a heat conductivity that is lower than a heat conductivity of the overcoat layer.

9 Claims, 8 Drawing Sheets

FLYING TYPE THIN-FILM MAGNETIC HEAD

BACKGROUND OF THE INVENTION

1. Field of the Invention

The present invention relates to a flying type thin-film magnetic head with an inductive write head element.

2. Description of the Related Art

Such flying type thin-film magnetic head is in general formed on a magnetic head slider flying above a magnetic disk surface in operation. When a write current flows through a coil of the inductive write head element, Joule heat will be produced and thus an over coat layer or a protection layer for covering the write head element will thermally expand to protrude a part of the magnetic head slider. Therefore, in a recent magnetic head slider with a very low flying height, its rear edge or trailing edge that will have the largest protruded amount may come into contact with and crash onto the surface of the rotating magnetic disk.

In order to prevent such head crash from occurring, the following countermeasures have been proposed:

(1) reduction of heat generation by lowering an electrical resistance of coil in the inductive write head element;

(2) improvement of heat radiation by thinning of an undercoat layer on the substrate;

(3) dissipation of heat by forming a metal pattern on the protection film (Japanese Patent Publication 05-266428-A2);

(4) forming of recess at the trailing edge of the magnetic head slider (Japanese Patent Publication 07-307070-A2); and (5) forming a recess portion on an air bearing surface (ABS) of the protection layer of the magnetic head slider (Japanese Patent Publication 04-366408-A2).

However, any of the proposed countermeasures cannot sufficiently reduce the protruded amount to satisfy an extremely lower flying height that will be required in future and thus further improvement is required.

BRIEF SUMMARY OF THE INVENTION

It is therefore an object of the present invention to provide a flying type thin-film magnetic head applicable to lower flying height requirement by resolving the head crash problems due to thermal expansion.

According to the present invention, a flying type thin-film magnetic head includes a write head element with a coil conductor and a yoke, a write current flowing through the coil conductor, an overcoat layer laminated on the write head element, and a heat-block layer formed in the overcoat layer and made of a material with a heat conductivity that is lower than a heat conductivity of the overcoat layer.

In the overcoat layer, the heat-block layer made of a material with a lower heat conductivity lower than that of the overcoat layer is formed or embedded. Thus, heat transmission is well blocked by this heat-block layer and thus the thermal expansion of the overcoat layer near its trailing edge is prevented to reduce the amount of protrusion of the trailing edge.

It is preferred that the heat-block layer is formed to cover a region with an area larger than that of a region on which the coil conductor is formed.

It is also preferred that the heat-block layer is formed to cover over the coil conductor.

It is preferred that the heat-block layer is formed in parallel with a plane on which the coil conductor is formed.

Preferably, a distance between the heat-block layer and an air bearing surface (ABS) is less than 15 µm, and more preferably less than 7.5 µm.

It is preferred that the thin-film magnetic head further includes a heater coil conductor formed below the heat-block layer for generating heat when the head is in operation. This heater coil conductor serves to heat the write head element when the element is in operation so that a part of the write head element intentionally protrudes from the ABS in order to reduce the flying height. In such thin-film magnetic head, heat transmission is well blocked by this heat-block layer and thus the thermal expansion of the overcoat layer near the trailing edge is prevented to reduce the amount of protrusion of the trailing edge.

It is also preferred that the heat-block layer is made of a resist material.

It is further preferred that the thin-film magnetic head includes a read head element.

Further objects and advantages of the present invention will be apparent from the following description of the preferred embodiments of the invention as illustrated in the accompanying drawings.

DETAILED DESCRIPTION OF THE INVENTION

Figure 1:
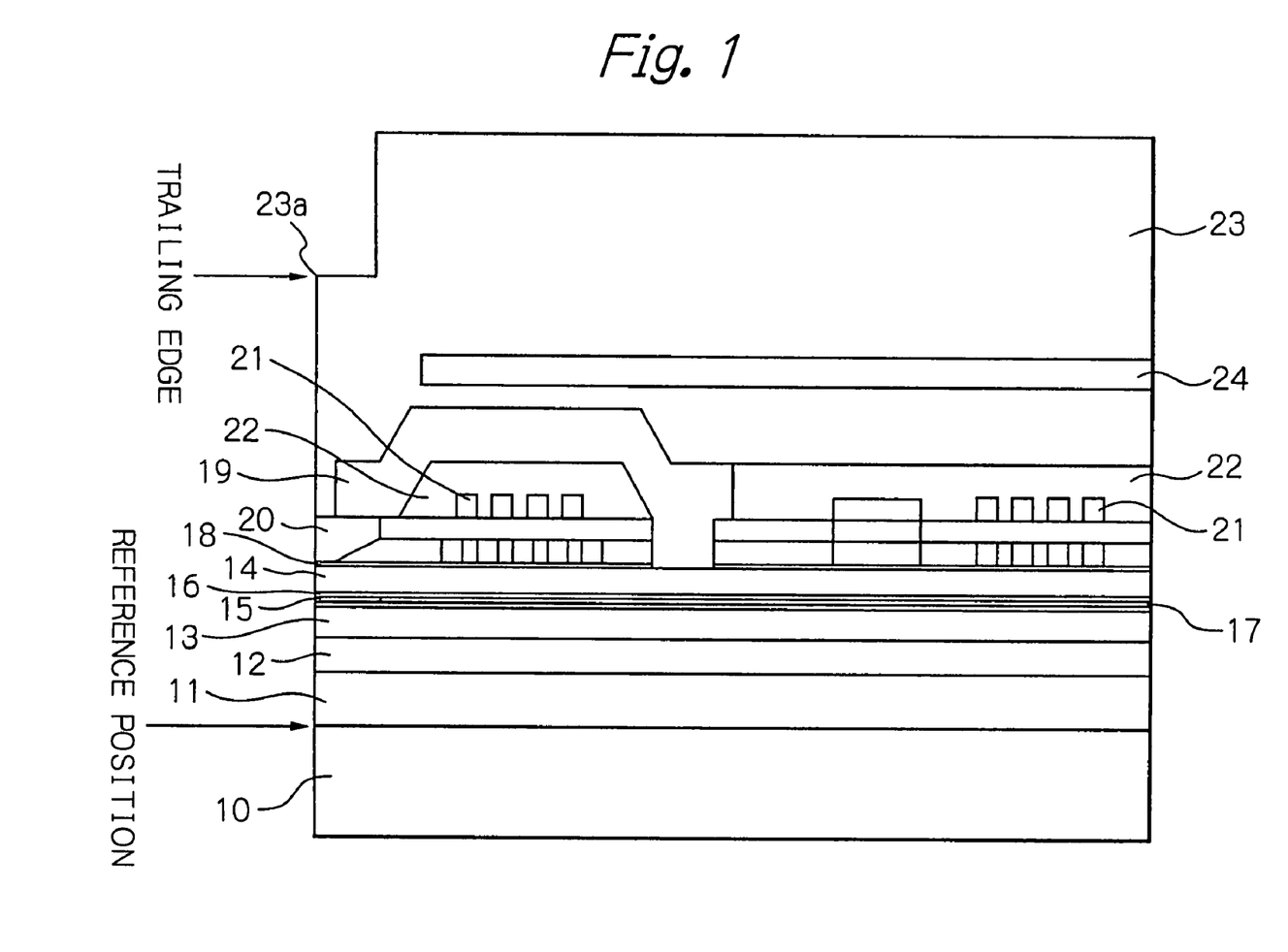
FIG. 1 is a sectional view schematically illustrating configuration of a thin-film magnetic head as a preferred embodiment according to the present invention.
Figure 2:
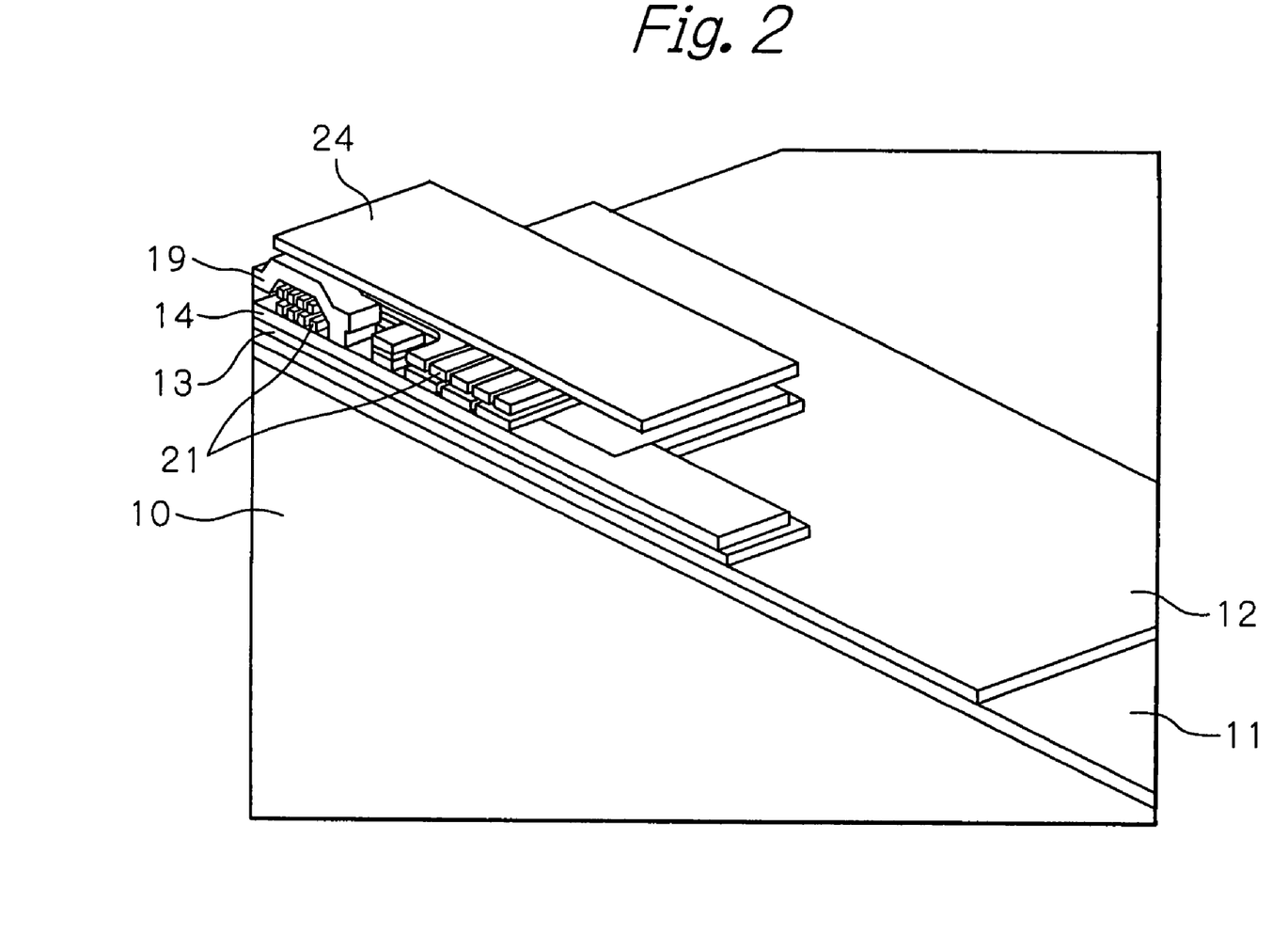
FIG. 2 is an oblique sectional view of the thin-film magnetic head shown in FIG. 1.

FIG. 1 schematically illustrates configuration of a thin-film magnetic head as a preferred embodiment according to the present invention, and FIG. 2 shows an oblique sectional view thereof. The thin-film magnetic head in this embodiment is a composite type thin-film magnetic head with an inductive write head element and a magnetoresistive effect (MR) read head element laminated with each other. However, the thin-film magnetic head in this embodiment may contain only an inductive write head element.

In these figures, reference numeral 10 denotes a substrate made of Al—TiC ($Al_2O_3$—TiC), 11 denotes an undercoat layer or under layer laminated on the substrate, 12 denotes an insulation layer laminated on the undercoat layer 11, 13 denotes a lower shield layer formed on the insulation layer 12, 14 denotes an upper shield layer also served as a lower pole layer, 15 denotes an MR layer formed between the lower and upper shield layers 13 and 14 through a shield gap layer 16, 17 denotes lead conductors electrically connected to the MR layer 15, 18 denotes a magnetic gap layer or record gap layer, 19 denotes an upper pole layer, 20 denotes an upper pole tip faced to a top end of the lower pole layer 14 through the magnetic gap layer 18, 21 denotes a coil conductor with a double layers structure, 22 denotes an insulation layer that surrounds the coil conductor 21, 23 denotes an overcoat layer or protection layer made of for example $Al_2O_3$, formed on the upper pole layer 19 and the insulation layer 22, and 24 denotes a heat-block layer formed in the overcoat layer 23 in parallel with the a plane on which the coil conductor 21 is formed and made of a material such as a resist material, with a lower heat conductivity than that of this overcoat layer 23, respectively.

The heat-block layer 24 is formed to cover a region with an area larger than that of a region on which the coil conductor 21 is formed and that of a region on which the upper pole layer 19 is formed. Thus, the heat-block layer 24 is formed to cover over the coil conductor 21.

The overcoat layer 23 has a recess at its ABS corner. Thus, as shown in FIG. 1, an edge of its lower stage constitutes the trailing edge 23a of the magnetic head slider.

The upper pole tip 20 is magnetically coupled with the upper pole layer 19 and this upper pole layer 19 is magnetically connected with the lower pole layer 14 at its rear so as to constitute a magnetic yoke of the inductive write head element.

Figure 3:
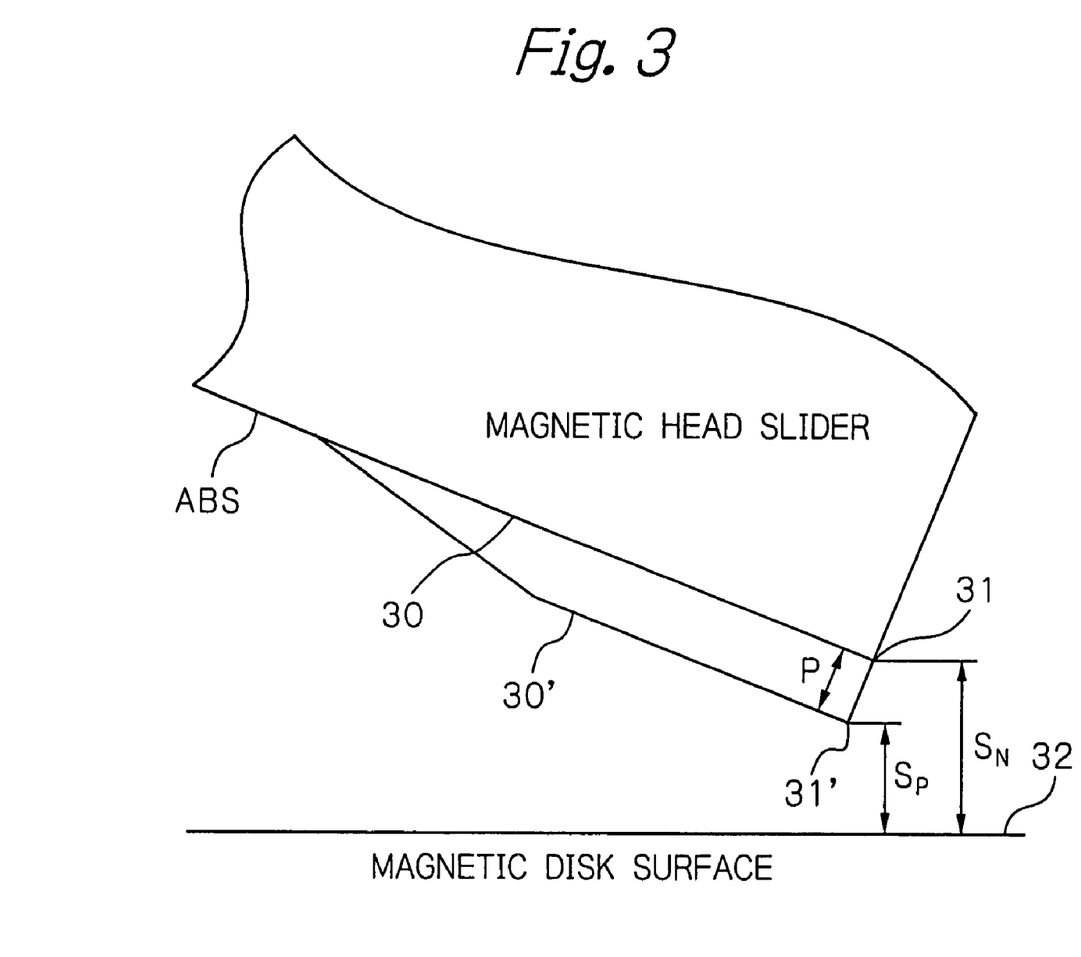
FIG. 3 illustrates protrusion of the ABS of a magnetic head slider due to its thermal expansion.

In the thin-film magnetic head with the inductive write head element, Joule heat is generated by write current flowing through the coil conductor, and the generated heat is transferred to the overcoat layer formed thereon. According to the prior art, as shown in FIG. 3, when heated, the overcoat layer easily expands due to a high heat conductivity of $Al_2O_3$, and thus a part of the ABS of the magnetic head slider protrudes from a normal position 30 to an expanded position 30'. Therefore, the trailing edge of the ABS moves from a position 31 to a position 31' by a protruded amount P to narrow the space between the trailing edge and a surface 32 of the magnetic disk from $S_N$ to $S_P$ causing head crash to easily occur.

Contrary to this, according to this embodiment, the heat-block layer 24 made of a resist material and provided with the area larger than that of the coil conductor 21 and that of the upper pole layer 19 is formed or embedded in the overcoat layer 23 to cover over these coil conductor 21 and also upper pole layer 19. A heat conductivity of $Al_2O_3$ constituting the overcoat layer 23 is 1 W/mK, whereas a heat conductivity of the resist material constituting the heat-block layer 24 is 0.35 W/mK which is greatly lower than the $Al_2O_3$ heat conductivity. Therefore, heat transmission is well blocked by this heat-block layer 24 and thus the thermal expansion of the overcoat layer 23 near the trailing edge is prevented to reduce the amount of protrusion of the trailing edge from the ABS.

Figure 4:
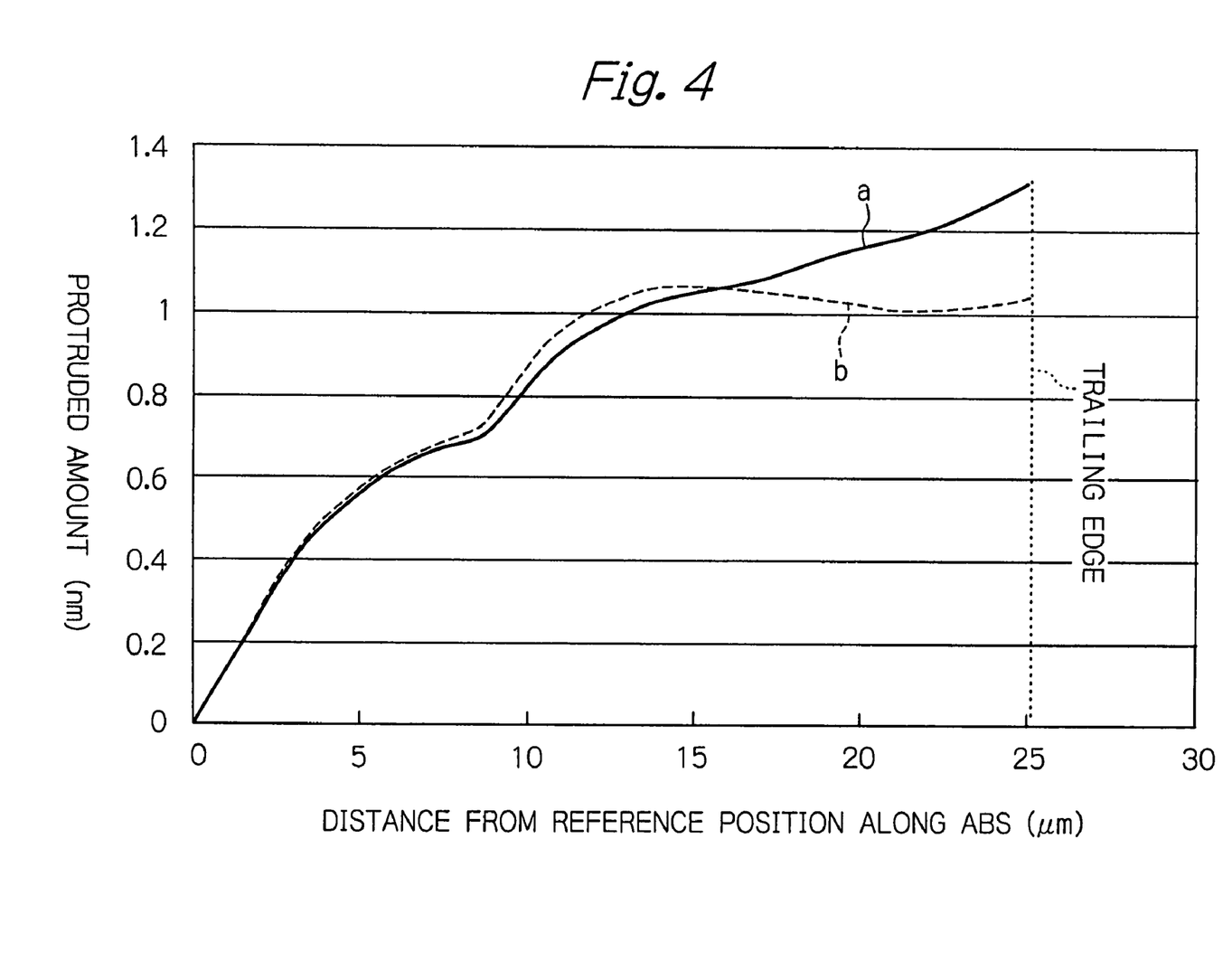
FIG. 4 is a graph illustrating the simulation result of a protruded amount from the ABS due to thermal expansion at each position of the ABS.

FIG. 4 illustrates the simulation result of a protruded amount from the ABS due to thermal expansion at each position of the ABS. In the figure, a line a represents the protruded amount of the conventional thin-film head with no heat-block layer, and a line b represents the protruded amount of the thin-film head with the heat-block layer according to this embodiment. The longitudinal axis of this figure indicates the protruded amount (nm), and the lateral axis indicates a distance (μm) along the ABS from a reference position that is defined at the interface of the substrate 10 and the undercoat layer 11. The heat-block layer 24 used for simulating the protruded amount has a rectangular parallelepiped with a thickness or a height seen from the ABS of 1.0 μm, a depth seen from the ABS of 106 μm and a width seen from the ABS of 113 μm. Also, the coil conductor 21 has a height of about 55 μm and a width of about 70 μm, and located with a space of 6 μm from the ABS.

As will be noted from comparison of the lines a and b, the thin-film magnetic head according to this embodiment can reduce the protruded amount near the trailing edge by about 0.3 nm, and thus possibility of contact or crash of the trailing edge onto the magnetic disk surface can be remarkably decreased even for a low-flying height thin-film magnetic head.

Figure 5:
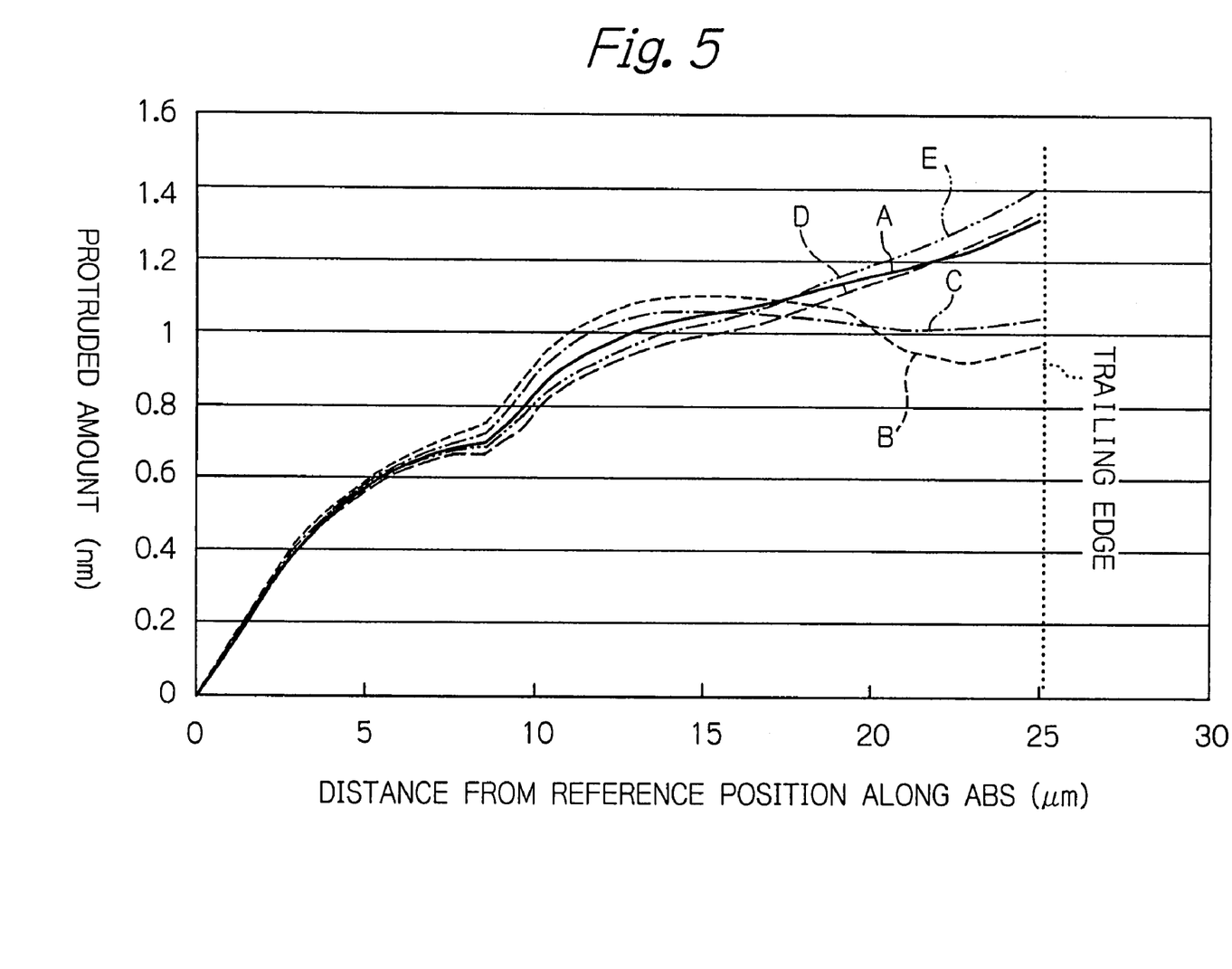
FIG. 5 is a graph illustrating the simulation result of a protruded amount from the ABS due to thermal expansion at each position of the ABS when a distance between a top end of a heat-block layer and the ABS is changed.

FIG. 5 illustrates the simulation result of a protruded amount from the ABS due to thermal expansion at each position of the ABS when a distance between a top end of the heat-block layer 24 and the ABS is changed. In the figure, a line A represents the protruded amount of the conventional thin-film head with no heat-block layer, and lines B to E represent the protruded amount of the thin-film head with the heat-block layer according to this embodiment. The distances between the top end of the heat-block layer and the ABS in the heads of lines B, C, D and E are 3 μm, 5 μm, 15 μm and 25 μm, respectively. The longitudinal axis of this figure indicates the protruded amount (nm), and the lateral axis indicates a distance (μm) along the ABS from a reference position that is defined at the interface of the substrate 10 and the undercoat layer 11.

As will be noted from the figure, if the distance between the top end of the heat-block layer 24 and the ABS is less than 15 μm, the protruded amount near the trailing edge becomes lower than that in the conventional thin-film magnetic head, and thus possibility of contact or crash of the trailing edge onto the magnetic disk surface can be decreased even for a low-flying height thin-film magnetic head. If the distance between the top end of the heat-block layer 24 and the ABS is less than 5 μm, more desired result is obtained.

Figure 6:
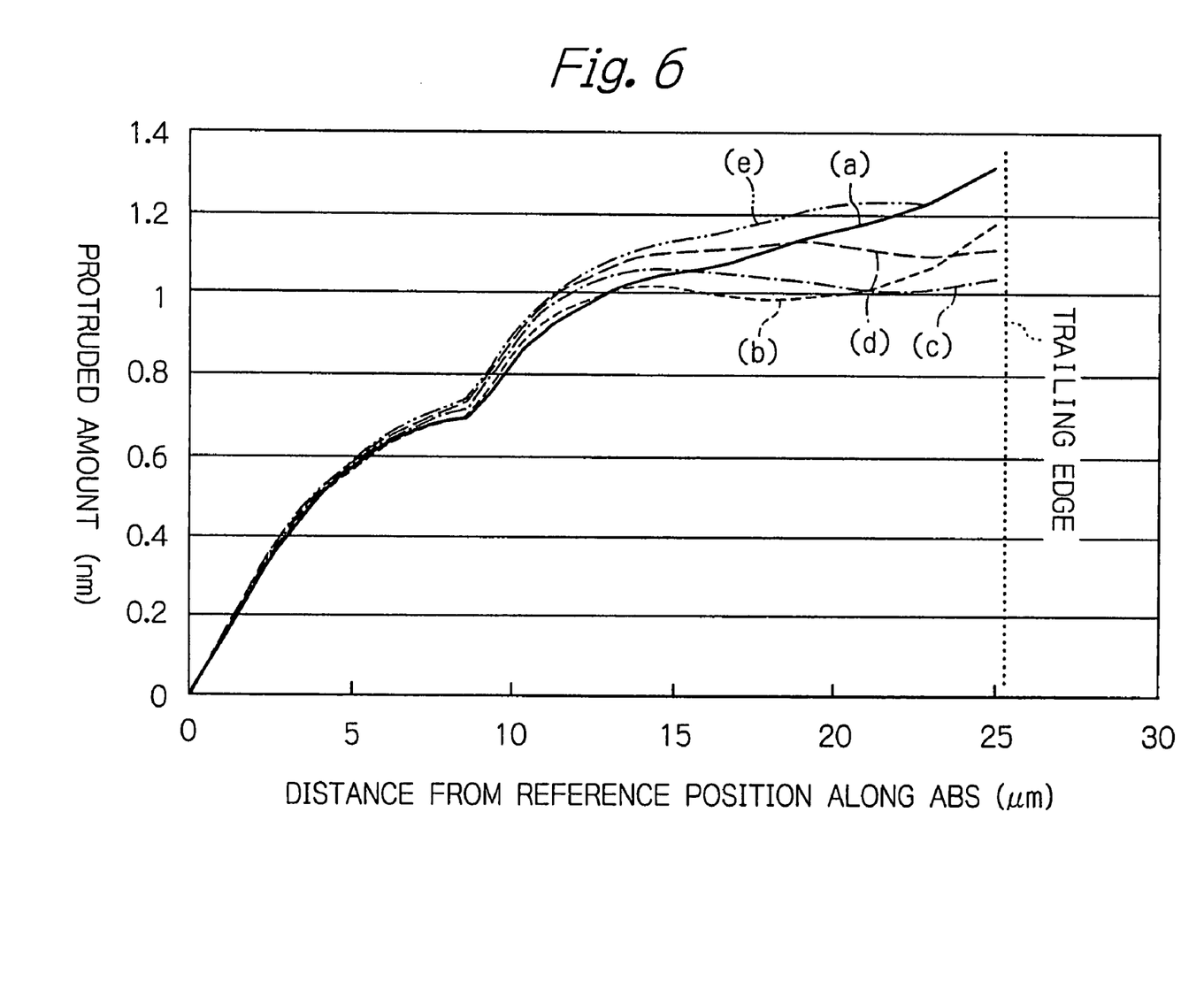
FIG. 6 is a graph illustrating the simulation result of a protruded amount from the ABS due to thermal expansion at each position of the ABS when a distance between the heat-block layer and an upper pole layer is changed.

FIG. 6 illustrates the simulation result of a protruded amount from the ABS due to thermal expansion at each position of the ABS when a distance between the heat-block layer 24 and the upper pole layer 19 is changed. In the figure, a line (a) represents the protruded amount of the conventional thin-film head with no heat-block layer, and lines (b) to (e) represent the protruded amount of the thin-film head with the heat-block layer according to this embodiment. The distances between the heat-block layer 24 and the upper pole layer 19 in the heads of lines (b), (c), (d) and (e) are 2 μm, 2.5 μm, 5.5 μm and 7.5 μm, respectively. The longitudinal axis of this figure indicates the protruded amount (nm), and the lateral axis indicates a distance (μm) along the ABS from a reference position that is defined at the interface of the substrate 10 and the undercoat layer 11.

As will be noted from the figure, if the distance between the top end of the heat-block layer 24 and the upper pole layer 19 is less than 7.5 μm, the protruded amount near the trailing edge becomes lower than that in the conventional thin-film magnetic head, and thus possibility of contact or crash of the trailing edge onto the magnetic disk surface can be decreased even for a low-flying height thin-film magnetic head. If the distance between the top end of the heat-block layer 24 and the upper pole layer 19 is 2.5–5.5 μm, more desired result is obtained.

Figure 7:
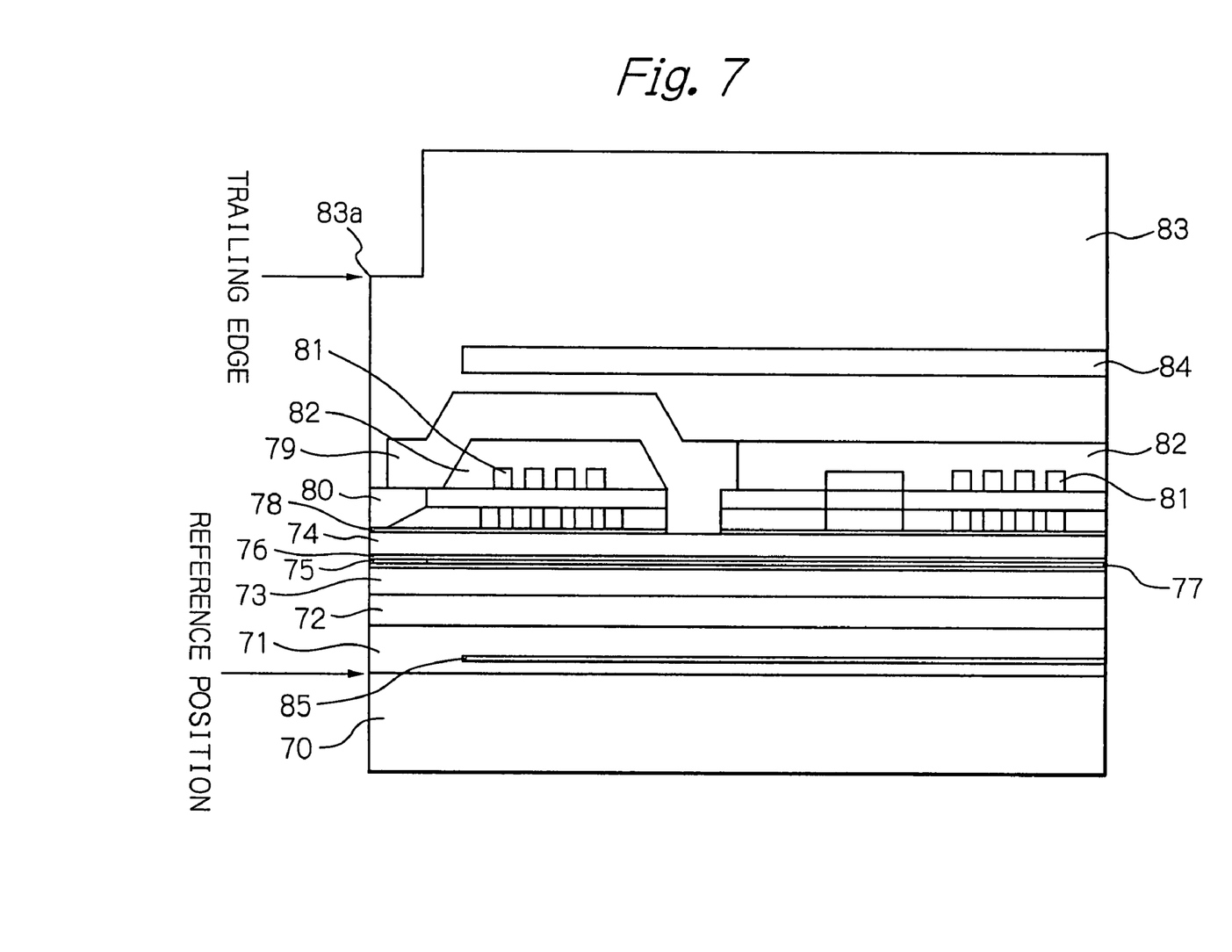
FIG. 7 is a sectional view schematically illustrating configuration of a thin-film magnetic head as another embodiment according to the present invention.

FIG. 7 schematically illustrates configuration of a thin-film magnetic head as another embodiment according to the present invention. The thin-film magnetic head in this embodiment is a composite type thin-film magnetic head with an inductive write head element and an MR read head element laminated with each other. However, the thin-film magnetic head in this embodiment may contain only an inductive write head element.

In the figure, reference numeral 70 denotes a substrate made of Al—TiC ($Al_2O_3$—TiC), 71 denotes an undercoat layer or under layer laminated on the substrate, 72 denotes an insulation layer laminated on the undercoat layer 71, 73 denotes a lower shield layer formed on the insulation layer 72, 74 denotes an upper shield layer also served as a lower pole layer, 75 denotes an MR layer formed between the lower and upper shield layers 73 and 74 through a shield gap layer 76, 77 denotes lead conductors electrically connected to the MR layer 75, 78 denotes a magnetic gap layer or record gap layer, 79 denotes an upper pole layer, 80 denotes an upper pole tip faced to a top end of the lower pole layer 74 through the magnetic gap layer 78, 81 denotes a coil conductor with a double layers structure, 82 denotes an insulation layer that surrounds the coil conductor 81, 83 denotes an overcoat layer or protection layer made of for example $Al_2O_3$, formed on the upper pole layer 79 and the insulation layer 82, and 84 denotes a heat-block layer formed in the overcoat layer 83 in parallel with the a plane on which the coil conductor 81 is formed and made of a material such as a resist material, with a lower heat conductivity than that of this overcoat layer 83, respectively.

The heat-block layer 84 is formed to cover a region with an area larger than that of a region on which the coil conductor 81 is formed and that of a region on which the upper pole layer 79 is formed. Thus, the heat-block layer 84 is formed to cover over the coil conductor 81.

An area of the heat-block layer 84 is larger than that of the coil conductor 81 and also that of the upper pole layer 79.

The overcoat layer 83 has a recess at its ABS corner. Thus, as shown in FIG. 7, an edge of its lower stage constitutes the trailing edge 83a of the magnetic head slider.

The upper pole tip 80 is magnetically coupled with the upper pole layer 79 and this upper pole layer 79 is magnetically connected with the lower pole layer 74 at its rear so as to constitute a magnetic yoke of the inductive write head element.

According to this embodiment, in particular, a heater coil conductor 85 is formed or embedded in the undercoat layer 71 formed below the heat-block layer 83. This heater coil conductor 85 serves to heat the write head element and/or the read head element when write and/or read operations so that a part of the write head element and/or the read head element intentionally protrudes from the ABS in order to reduce the flying height.

Not only heat from this heat coil conductor 85 but also Joule heat generated by write current flowing through the coil conductor 81 may be transferred to the overcoat layer 83 formed thereon. However, according to this embodiment, the heat-block layer 84 made of a resist material and provided with a larger area than that of the coil conductor 81 and the upper pole layer 79 is formed or embedded in the overcoat layer 83 to cover over these coil conductor 81 and upper pole layer 79. A heat conductivity of $Al_2O_3$ constituting the overcoat layer 83 is 1 W/mK, whereas a heat conductivity of the resist material constituting the heat-block layer 84 is 0.35 W/mK which is greatly lower than the $Al_2O_3$ heat conductivity. Therefore, heat transmission is well blocked by this heat-block layer 84 and thus the thermal expansion of the overcoat layer 83 near the trailing edge is prevented to reduce the amount of protrusion of the trailing edge from the ABS.

Figure 8:
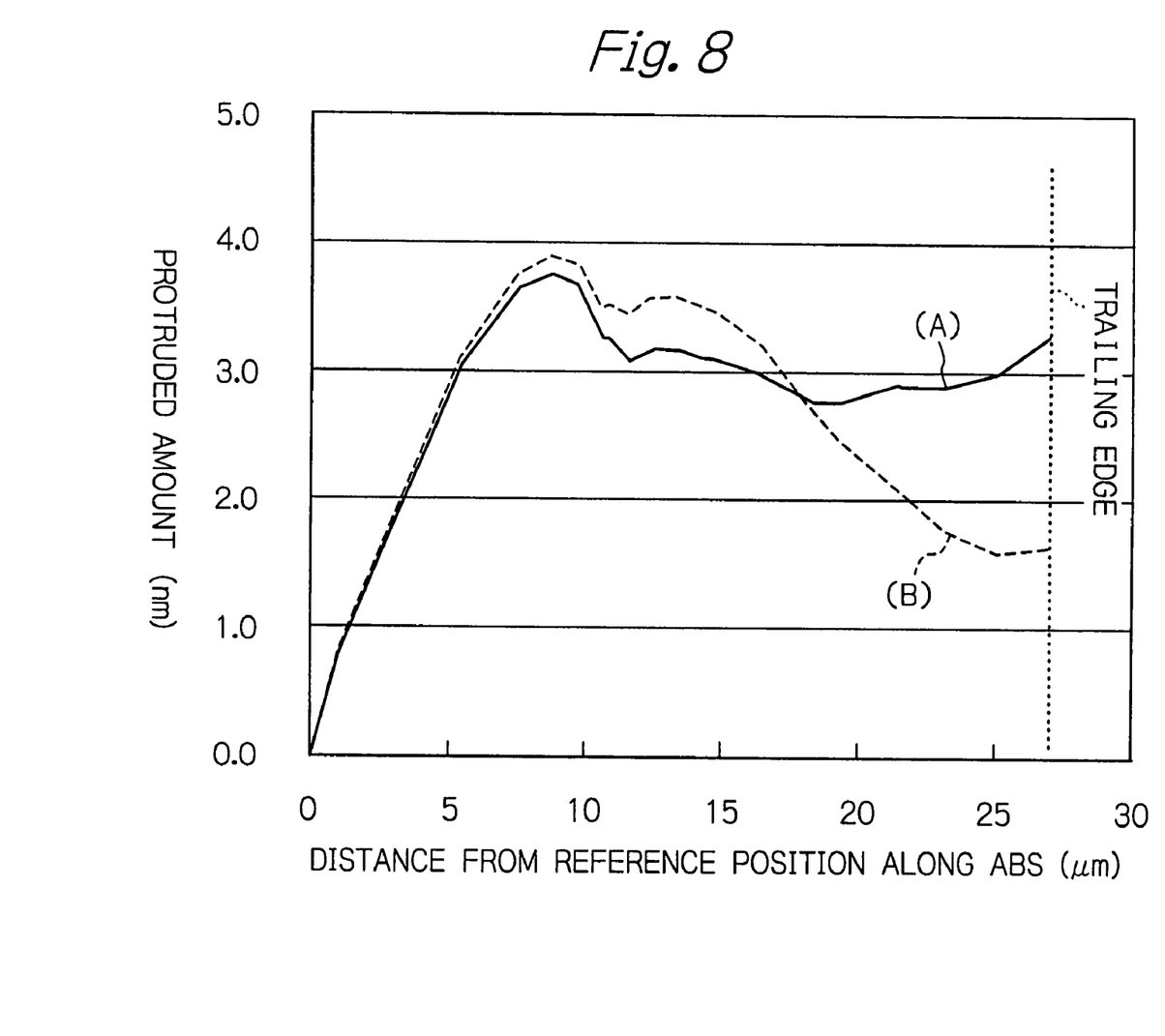
FIG. 8 is a graph illustrating the simulation result of a protruded amount from the ABS due to thermal expansion at each position of the ABS.

FIG. 8 illustrates the simulation result of a protruded amount from the ABS due to thermal expansion at each position of the ABS. In the figure, a line (A) represents the protruded amount of the conventional thin-film head with no heat-block layer, and a line (B) represents the protruded amount of the thin-film head with the heat-block layer according to this embodiment. The longitudinal axis of this figure indicates the protruded amount (nm), and the lateral axis indicates a distance (μm) along the ABS from a reference position that is defined at the interface of the substrate 70 and the undercoat layer 71. The heat-block layer 84 used for simulating the protruded amount has a rectangular parallelepiped with a thickness or a height seen from the ABS of 1.0 μm, a depth seen from the ABS of 106 μm and a width seen from the ABS of 113 μm. Also, the coil conductor 81 has a height of about 55 μm and a width of about 70 μm, and located with a space of 6 μm from the ABS.

As will be noted from comparison of the lines (A) and (B), the thin-film magnetic head according to this embodiment can reduce the protruded amount near the trailing edge by about 2.0 nm, and thus possibility of contact or crash of the trailing edge onto the magnetic disk surface can be remarkably decreased even for a low-flying height thin-film magnetic head with the heater coil.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A flying type thin-film magnetic head comprising:
a write head element with a coil conductor and a yoke, a write current flowing through said coil conductor;
an overcoat layer laminated on said write head element; and
a heat-block layer formed in said overcoat layer and made of a material with a heat conductivity that is lower than a heat conductivity of said overcoat layer, said heat-block layer being formed between said write head element and a trailing edge of said thin-film magnetic head to reduce the protrusion of the trailing edge.

2. The thin-film magnetic head as claimed in claim 1, wherein said heat-block layer is formed to cover a region with an area larger than that of a region on which said coil conductor is formed.

3. The thin-film magnetic head as claimed in claim 1, wherein said heat-block layer is formed to cover over said coil conductor.

4. The thin-film magnetic head as claimed in claim 1, wherein said heat-block layer is formed in parallel with a plane on which said coil conductor is formed.

5. The thin-film magnetic head as claimed in claim 1, wherein a distance between said heat-block layer and an air bearing surface is less than 15 μm.

6. The thin-film magnetic head as claimed in claim 1, wherein a distance between said heat-block layer and an air bearing surface is less than 7.5 μm.

7. The thin-film magnetic head as claimed in claim 1, wherein said thin-film magnetic head further comprises a heater coil conductor formed below said heat-block layer for generating heat when said head is in operation.

8. The thin-film magnetic head as claimed in claim 1, wherein said heat-block layer is made of a resist material.

9. The thin-film magnetic head as claimed in claim 1, wherein said thin-film magnetic head further comprises a read head element.

* * * * *